United States Patent [19]

Rumsey

[11] Patent Number: 4,737,134
[45] Date of Patent: Apr. 12, 1988

[54] SOUND PRODUCING BALL

[76] Inventor: Daniel L. Rumsey, 5520 W. 118th Pl., Inglewood, Calif. 90304

[21] Appl. No.: 839,285

[22] Filed: Mar. 13, 1986

[51] Int. Cl.[4] .............................................. A63H 33/26
[52] U.S. Cl. .................................. 446/409; 273/58 G
[58] Field of Search ............... 446/175, 397, 409, 484, 446/485; 434/303, 22; 273/58 G, 58 E, DIG. 27

[56] References Cited

U.S. PATENT DOCUMENTS

| | | | |
|---|---|---|---|
| 3,304,651 | 2/1967 | Deyerl | 446/439 |
| 3,508,751 | 4/1970 | Meyer et al. | 273/310 X |
| 3,935,669 | 2/1976 | Potrzuski et al. | 273/58 G X |
| 4,294,035 | 10/1981 | Klein | 446/175 X |
| 4,403,777 | 9/1983 | Del Principe et al. | 273/1 E |

*Primary Examiner*—Robert A. Hafer
*Attorney, Agent, or Firm*—Blakely, Sokoloff, Taylor & Zafman

[57] ABSTRACT

A sound producing device producing different tones when rotated in front of a light source. A light transducer mounted at one spot at the surface of the device produces signals corresponding to the amount of light illuminating the light transducer. An oscillator is coupled to the light transducer and to a speaker to produce the tones. A motion switch is coupled to the oscillator to shut off production of sound when the device has been left at rest for a certain time period.

5 Claims, 1 Drawing Sheet

SOUND PRODUCING BALL

BACKGROUND OF THE INVENTION

1. Field of the Invention

This invention relates to the field of toys and amusement devices.

2. Prior Art

In the prior art, there are several examples to toy balls which will produce sounds when activated. For example, Anthony, U.S. Pat. No. 2,780,029 discloses a ball which contains a music box which plays a predetermined tune when activated. Oman, et al., U.S. Pat. No. 2,942,379 and Sebree, U.S. Pat. No. 3,395,462 each disclose balls inside of which are mounted mechanical bells which ring when the ball is moved or rolled. De Costa, U.S. Pat. Nos. 1,709,841 and 1,789,333 disclose a diaphragm contained within a ball which produces a noise or tone when moved from a position of equilibrium. These prior art balls are constrained by the fact that tones of only a single pitch are produced or, if different pitches are available, are the result of a predetermined and fixed source.

It is an object of the present invention to provide a ball which will produce tones of varying pitch, depending upon the orientation of the ball with respect to a light source as the ball is rolled or thrown by the user.

It is a further object of the present invention to provide a ball which will turn on when a user picks it up and turn off when a user ceases manipulation, thereby to avoid the necessity of a switch or the inadvertent discharge of the batteries.

SUMMARY OF THE INVENTION

The present invention is a sound producing device which produces a tone whose pitch depends on the amount of light illuminating said device as well as the orientation of said device with respect to a light source. Signal producing means generate a unique signal for reach orienation of said device with respect to a light source. Converting means electrically convert each signal into a tone whose pitch depends on the signal received by the converting means. A motion detection means shuts off the production of sound when the device has been left at rest for a certain time period.

DETAILED DESCRIPTION OF THE PRESENT INVENTION

A ball is described which in a preferred embodiment produces tones of varying pitch depending on the amount of visible light illuminating a small portion of the ball surface where a light sensitive transducer is located.

Preferred Embodiment

Figure 1:
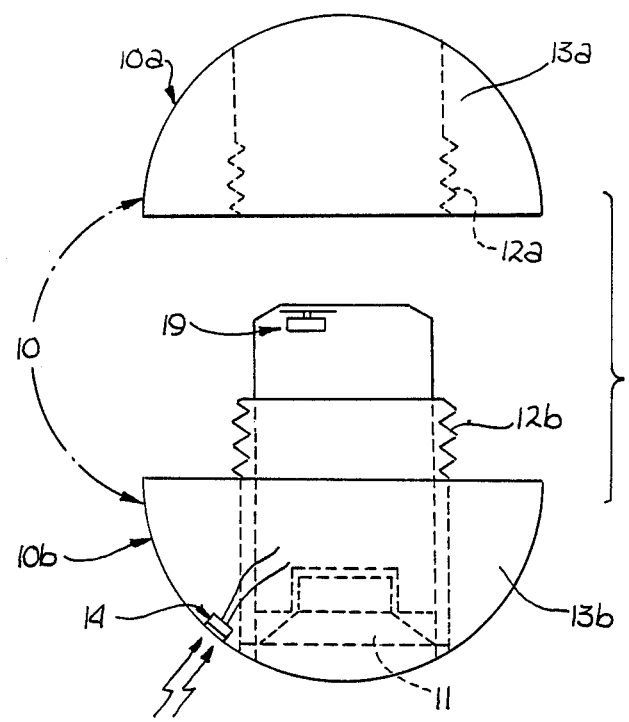
FIG. 1 is a plan view illustrating the ball of the present invention with a speaker power source and circuit board disposed therein.

In a preferred embodiment of the present invention, a visible light transducer, electronic means for producing sound, a power source and a speaker are mounted inside a hollow sphere or ball as shown in FIG. 1. The ball 10 is comprised of a top half 10a and a bottom half 10b which are removably connected. In the embodiment shown in FIG. 1, section 10b includes a threaded portion 12 which threadedly engages a complementary portion of section 10a. A speaker 11 is mounted within the ball 10 and affixed so as to prevent unwanted movement of the speaker even when subjected to reasonable shock and vibration. Also attached to the speaker 11 and ball 10b is a member 13 extending along a diameter of the ball 10. Member 13 may be flat or cylindrical but is proportioned and centered to provide balance to the ball 10 with the speaker and other components thereon. For this purpose member 13 may be weighted at the end opposite the speaker to provide balance and less eccentric rolling motion if desired.

Figure 2:
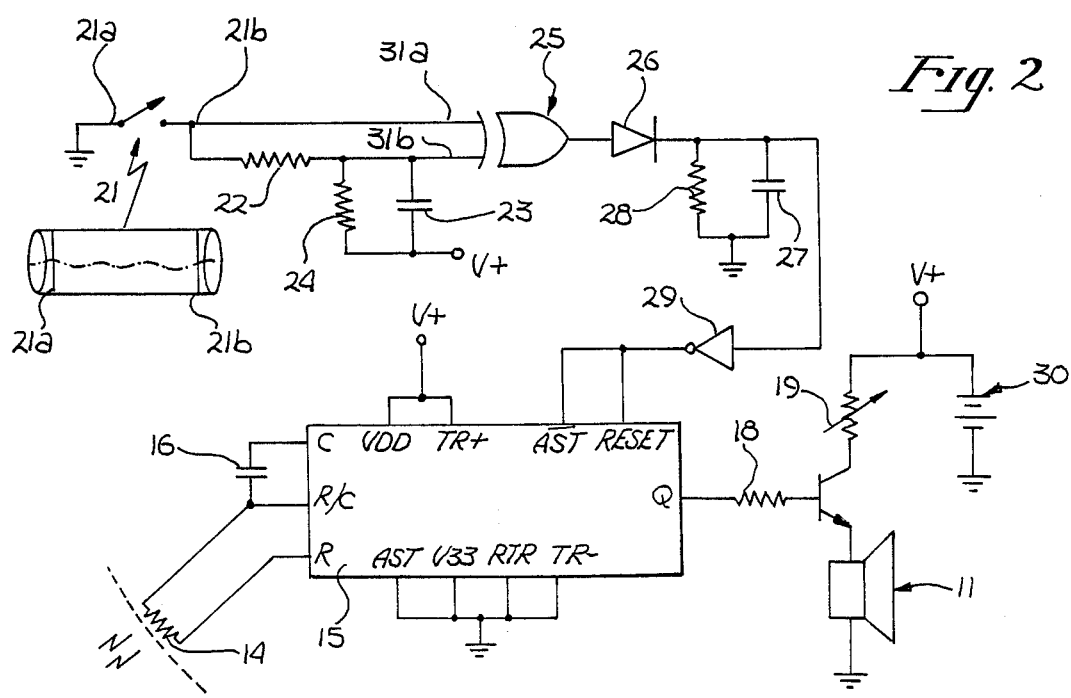
FIG. 2 is an electrical schematic illustrating a circuit used to convert the output of a Photoconductive Cell into audible tones of varying pitch.

The circuitry of that embodiment is mounted on the member 13 so as to provide a stable environment and good support for the circuitry. Remaining unoccupied cavities within the ball are potted with a styrofoam material to prevent damage to the circuitry when the ball is thrown or dropped. Details of the sound producing circuitry may be seen in FIG. 2. In order to have a ball which produces different sounds when rotated to different orientations with respect to a light source (sun, indoor light, etc.), it is first necessary to have a means of generating different signals for different orientations of the ball with respect to a light source. The present invention accomplishes this by the use of visible light transducer which is a Photoconductive Cell 14 shown in FIG. 2 and is mounted near the surface of the ball underneath a protective clear silicone rubber cement as shown in FIG. 1. The Photoconductive Cell 14 is a light sensitive resistor whose resistance decreases in proportion to the amount (quanta) of light illuminating the face of the Photoconductive Cell 14. The Photoconductive Cell 14 is located at only one spot on the surface of ball 10. Therefore, the resistance of the Photoconductive Cell 14 will vary as the ball is rotated by the user with respect to one or more light sources.

The Photoconductive Cell 14 is connected directly to the "R" and "R/C" inputs of a stable multivibrator (oscillator) 15. A capacitor 16 is connected to the "C" and "R/C" inputs of oscillator 15. The oscillator 15 has as output a square wave. The frequency of this square wave output may be altered by altering the resistance of the Photoconductive Cell 14. The Photoconductive Cell 14 resistance and capacitor 16 act as an "R/C" circuit which has a time constant dependent upon the value of Photoconductive resistance 14 and value of fixed capacitor 16. This time constant controls the clocking of oscillator 15 and thus the frequency of the output pulse rate of the oscillator. Thus, by changing the illumination onto the Photoconductive Cell 14 different oscillation frequencies (pulse rates) are produced by oscillator 15. The value of capacitor 16 and the range of resistance values as a function of illumination for Photo-cell 14 are chosen such that the frequency of oscillation from oscillator 15 varies from about 10 KHz under high illumination (direct sun light) to only a few pulses per second under marginal indoor lighting conditions. The output of oscillator 15 is coupled to the base of transistor 17 through resistor 18. The collector of transistor 17 is coupled to voltage source V+ through variable resistor 19. The emitter of transistor 17 is coupled to speaker 11. The variable resistor 19 is used as a volume control for speaker 11. Depending upon the frequency of the signal at the output of oscillator 15, the speaker 20 will emit a tone of varying pitch. By turning the ball in different directions with respect to a light source, the resistance of Photoconductive Cell 14 is changed and as a result different pitches are heard from speaker 11.

The production of sound only when the ball is rotating is as follows. Switch 21 is a motion switch mounted on the circuit board within ball 10. Switch 21 is ¾" diameter by 1½" long hollow plastic cylinder sealed at both ends and half filled with small carbon particles. Two electrodes 21a and 21b enter the cylinder near either end as shown. When ball 10 is picked up and rotated, the switch contacts 21a and 21b will either make or break electrical connection via conduction or lack of conduction through the carbon particles. Exclusive or gate 25, which is a logic comparator, has two inputs from switch contact 21b, a direct input via line 31a and a delayed input via resistor 22 and capacitor 23. Resistor 24, connected between line 31b and the positive voltage supply V+, is a pull up resistor for switch 21. Switch contact 21a is connected to ground. Any difference in logic states between the delayed input 31b and the direct input 31a to exclusive OR gate 25, resulting from the "making" or breaking of switch contacts 21a, 21b due to rotation of ball 10, will cause the output of exclusive OR gate 25 to go high for a minimum of 100 milliseconds. The 100 milliseconds is the resistor 22/capacitor 23 time contant. The output of exclusive OR gate 25 is connected to capacitor 27, resistor 28 and inverter input 29 via diode 26. The other side of capacitor 27 and resistor 28 are connected to ground. When the output of exclusive OR gate 25 goes high, capacitor 27 is charged through diode 26. This in turn removes the logic "high" on the reset and $\overline{\text{AST}}$ (inverted asynchronous trigger) inputs of oscillator 15 via the output of inverter 29 allowing oscillator 15 to start oscillating. Capacitor 27 will slowly discharge through resistor 28 with about a 2 second time constant and will turn off oscillator 15 in about 2 seconds unless switch 21 keeps changing states, on to off, off to on, etc. to keep C3 charged as would be the case if the ball were rotated by the user. Diode 26 allows capacitor 27 to rapidly charge since diode 26 is forward biased during charging. Diode 26 is reversed biased when capacitor 27 is discharging yielding a much longer discharge time constant controlled by resistor 28.

Although the present invention has been described as disposed within a hollow sphere, other suitable shapes may be employed. For example, the device could be contained with a cube, an octahedron, a cylinder or other desired shapes. Additionally, more than on Photoconductive Cell may be utilized.

Thus, a sound producing ball has been described which can produce tones of varying pitch depending upon its orientation with respect to a light source and will turn itself on when rotated and off when stationary.

I claim:

1. A sound producing toy ball comprising:
   speaker means mounted within said ball;
   power supply means mounted within said ball;
   switch means coupled to said power supply means and mounted within said ball;
   light sensing means mounted on a surface of said ball, said light sensing means producing a first signal whose value is dependent on the amount of light received by said light sensing means;
   converting means coupled to said switch means, said power supply means, said speaker means and said light sensing means, said converting means converting said first signal to a second signal having a frequency dependent on said value of said first signal;
   said converting means outputting said second signal to said speaker means for producing an audible tone whose pitch is dependent on said frequency of said second signal;
   control means coupled to said switch means, said power supply means and said converting means, said control means for disabling said converting means when said switch means does not change state for a fixed period of time;
   whereby a tone whose pitch is dependent on the amount of light received by said light sensing means is produced.

2. The toy ball of claim 1 wherein said light sensing means comprises a photoconductive cell.

3. The toy ball of claim 1 wherein said ball comprises a first section removably coupled to a second section so as to form a sphere.

4. The toy ball of claim 1 wherein said converting means comprises an oscillator coupled to said first signal and to a capacitor, said first signal comprising a resistance whose value varies dependent on light received by said light sensing means, said capacitor and said value of resistance controlling said frequency of said second signal.

5. The toy ball of claim 1 wherein said switch means comprises a hollow cylinder, said cylinder sealed at both ends, said cylinder approximately half filled with carbon particles, said cylinder having first and second electrodes, one of said electrodes at each end of said cylinder.

* * * * *